July 26, 1966 R. F. C. VESSOT 3,263,183
COMPOSITE ATOM STORAGE CELL AND CAVITY RESONATOR STRUCTURE
FOR AN ATOMIC HYDROGEN MASER
Filed Sept. 24, 1962
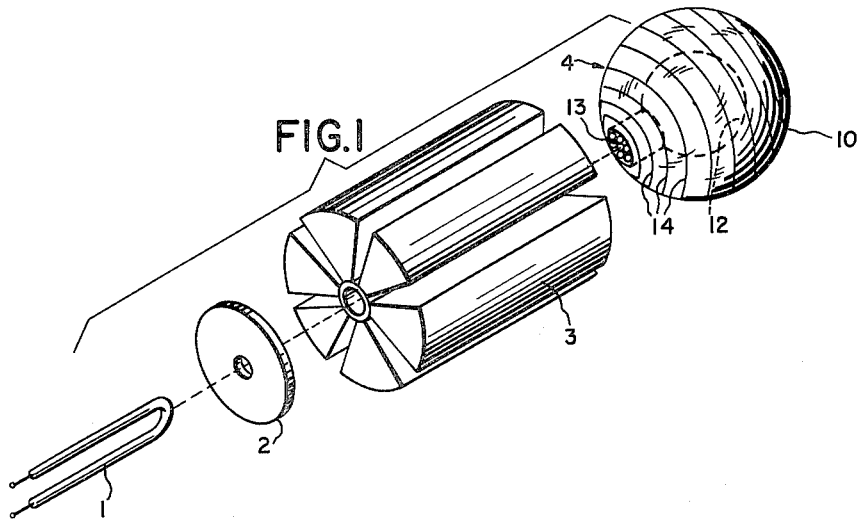
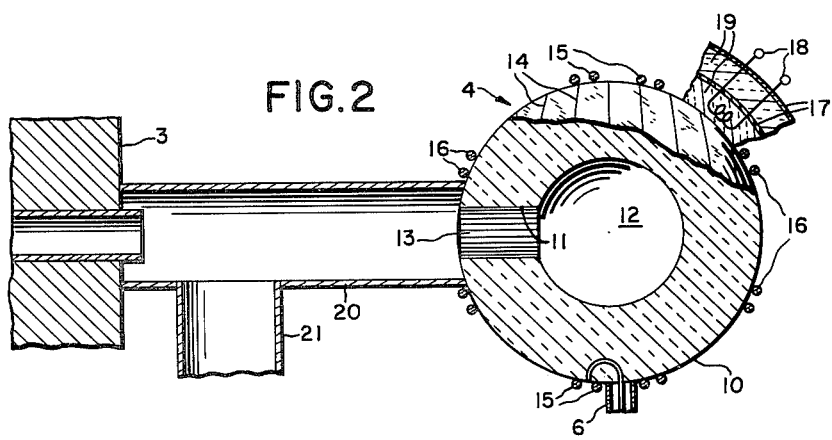
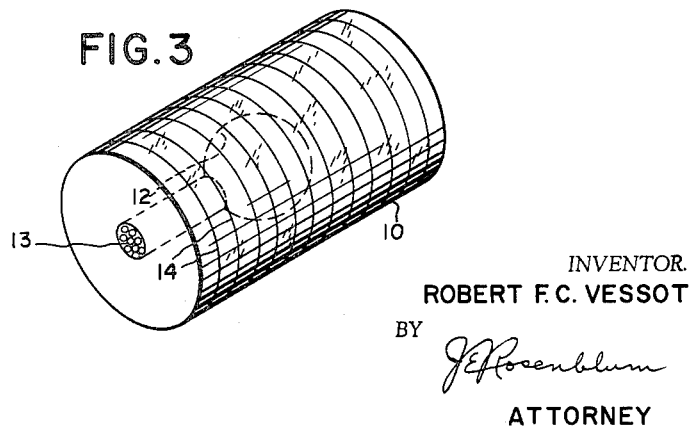
INVENTOR.
ROBERT F. C. VESSOT
BY
*J. E. Rosenblum*
ATTORNEY 3,263,183
COMPOSITE ATOM STORAGE CELL AND CAVITY RESONATOR STRUCTURE FOR AN ATOMIC HYDROGEN MASER
Robert F. C. Vessot, Marblehead, Mass., assignor to Varian Associates, Palo Alto, Calif., a corporation of California
Filed Sept. 24, 1962, Ser. No. 225,690
7 Claims. (Cl. 331—94)

The present invention relates in general to quantum resonance devices, and more particularly to a novel composite atom storage cell and cavity resonator structure for an atomic hydrogen maser.

An atomic hydrogen maser, as disclosed by N. F. Ramsey and D. Kleppner in Physical Review Letters, 5, 361 (October 15, 1960), and also in copending U.S. patent application Serial No. 142,356, filed October 2, 1961, is a device which generates high spectral purity microwave energy as a consequence of quantum resonance transitions of hydrogen atoms between magnetic hyperfine states. The atoms are confined in a storage cell which is lined with a non-relaxing material such as hydrogen-saturated or halogen-saturated compound, said container being positioned in a microwave cavity resonator which is tuned to the hydrogen hyperfine transition frequency of approximately 1420 mc. With such storage cell linings repeated collisions of hydrogen atoms with the cell walls do not appreciably perturb the interaction of atoms with the radiation field in the cavity and the long interaction times required for self-sustaining oscillation (maser action) at the transition frequency are obtained. These oscillations excite a resonant mode of the cavity resonator from which energy is extracted via an appropriate microwave coupling.

Heretofore it has been the practice to support the storage cell within an air-filled cavity resonator. This results in an undesirably bulky structure, and one in which the cavity resonator may readily be detuned by thermal changes and mechanical shock.

The principal object of the present invention is to overcome these and other limitations in the prior art by the provision of a compact and rugged unitary storage cell and cavity resonator structure.

Various features and advantages of the present invention will become more apparent after a perusal of the following specification taken in connection with the accompanying drawings wherein, FIG. 1 is a perspective view of the elements of an atomic hydrogen maser in accordance with the present invention, FIG. 2 is a cross-sectional view of the detailed construction of a composite storage cell and cavity resonator structure in accordance with the present invention, and FIG. 3 is a perspective view of an alternative composite storage cell and cavity resonator structure in accordance with the present invention.

The basic elements of an atomic hydrogen maser are illustrated in FIG. 1. Discharge tube 1 provides a beam of hydrogen atoms which is collimated by an annular stop 2, directed through a hexapole magnet 3, and intercepted by a composite storage cell and cavity resonator structure 4. As a result of the selective focusing action of the magnet 3, only hydrogen atoms in the upper $F=1$ hyperfine state enter the structure 4, and the transition of these atoms to the lower $F=0$ hyperfine state results in the desired maser oscillations which are coupled out via coaxial line 6, turned 90° for clarity. The co-axial line includes a coupling loop connected at its inner end to the conductive wall of the resonator structure 4 in the conventional manner.

Detailed construction of the composite storage cell and cavity resonator structure 4 is shown in FIG. 2. The main structural element is a solid sphere 10 of a material such as quartz which is characterized by a high dielectric constant and a low microwave frequency loss tangent. Formed within the sphere 10 is a cylindrical passageway 11 opening into a concentric spherical cavity 12. The outside of the sphere 10 has a coating of a highly conductive material such as silver defining the boundary of a 1420 mc. microwave cavity resonator, and the internal cavity 12 is lined with a suitable storage cell material such as Teflon (polytetrafluoroethylene). Thus, there is provided a unitary rugged structure which is also compact due to the fact that the effective relative dielectric constant $\epsilon$ of the cavity resonator is greater than unity, 3.85 in the case of quartz, which reduces the radius required for resonance by a factor of $1/\sqrt{\epsilon}$ over that required with an air-filled cavity resonator.

In order to compensate for microwave losses which may be caused by the dielectric loading of the cavity resonator, it is desirable to increase the beam flux in the storage cavity 12. This is accomplished by using an enlarge opening 11 containing a collimator 13 consisting of a bundle of small, thin hollow tubes. This collimator allows the axially directed beam of atoms to enter the cavity through the tubes, but prohibits the randomly directed atoms within the cavity from leaving until they happen upon the trajectory which will take them back through the tubes, the storage time for an atom being the time from its entrance into the chamber until it randomly finds the proper trajectory back out of the tubes. The tubes are made from a material with a non-relaxing surface. Such a bundle of tubes may be made, for example, by a stacked array of wrinkled Teflon film.

The conducting resonator coating is provided with a plurality of circumferential scratches or discontinuities 14 coaxil about an axis parallel to the beam axis to remove the silver coating to produce a series of alternating conducting and dielectric rings, thereby guiding the R.F. currents along the scratches and forcing a resonant mode with R.F. magnetic field directed along the beam axis. By forming the scratches in a continuous manner, such as in a helical form, a solenoid can be provided for a low frequency or D.C. magnetic field when desired as an alternative to a separate coil 15 as described below. For uniformity of such fields throughout the cavity, the density of scratches should vary as the sine of the angular position on the sphere relative to the symmetry axis of the scratches.

Two sets of orthogonal coils 15 and 16 are wound about the outside of the sphere in order to provide a small static magnetic field of variable orientation with reference to the R.F. magnetic field in the cavity, thus enabling the selection of one or more of the various field-independent or field-dependent hyperfine transitions. The windings of these coils may also be sinusoidally distributed for improved uniformity.

The entire structure 4 is enclosed within a set of high permeability metal concentric shields 17 for shielding the cavity from external magnetic fields. Thermal stability of the structure is provided by a variable heating coil 18 and insulating material 19 such as glass fibers between the shields 17. The sphere 10 is sealed to the usual vacuum housing 20 which is evacuated through port 21. The spent hydrogen gas is also exhausted via port 21.

FIG. 3 illustrates an alternative configuration in which the dielectric material 10 is in the shape of a cylinder about the beam axis. The scratches 14, concentric about this axis, force the R.F. currents therealong and establish a $TE_{0,1,1}$ resonant mode with axial magnetic field.

Since many changes can be made in the above construction and many apparently widely different embodiments of this invention could be made without departing from the scope thereof, it is intended that all matter contained in the above description or shown in the accom-

What is claimed is:

1. A storage cell for an atomic hydrogen maser comprising: a chamber with an entrance tube for receiving a collimated beam of particles directed therethrough; and a beam collimator disposed in said entrance tube substantially at the point of entrance of said tube into said chamber, said collimator comprising a bundle of small, thin tubes made from a material with a non-relaxing surface.

2. A storage cell according to claim 1 wherein said bundle of tubes comprises a stacked array of wrinkled Teflon film.

3. A composite atom storage cell and cavity resonator for an atomic hydrogen maser comprising: a solid low R.F. loss tangent dielectric member having an opening therein, said opening being shaped to provide a beam entrance tube which opens into an atom storage chamber formed in said solid dielectric member; a conducting coating on the outside of said dielectric member for forming the conducting boundaries of a cavity resonator tuned to the hyperfine magnetic resonance frequency of hydrogen atoms which pass through said entrance tube; a non-relaxing lining on the walls of said storage chamber for permitting repeated collisions of hydrogen atoms thereagainst without appreciable perturbation of the interaction of said atoms with radiation fields in said chamber; and means for coupling energy from said cavity resonator at said resonance frequency and the size of said chamber formed in said solid dielectric member defining the thickness of the dielectric walls of said dielectric member, and wherein the walls of said dielectric member are dimensioned of sufficient thickness to produce substantial dielectric loading of the resonator to substantially reduce the physical size of the resonator as compared to a non-dielectrically loaded cavity resonator tuned to the same frequency.

4. The apparatus according to claim 3 wherein said solid dielectric member is made of quartz.

5. The apparatus according to claim 4 wherein said quartz dielectric member is of spherical shape.

6. A device according to claim 3 including a plurality of discontinuities in said conducting coating, said discontinuities extending coaxially about the axis of said entrance tube to force a resonant mode for said cavity resonator with microwave magnetic field directed along said tube axis.

7. A device according to claim 3 including a beam collimator in said entrance tube located substantially at the point in said tube where said entrance tube opens into said atom storage chamber, said collimator comprising a bundle of small, thin tubes made from a material with a non-relaxing surface.

References Cited by the Examiner

UNITED STATES PATENTS

| | | | |
|---|---|---|---|
| 2,704,830 | 3/1955 | Rosencrans | 333—83 |
| 2,948,861 | 8/1960 | Babb | 331—94 X |
| 2,991,389 | 7/1961 | Grant et al. | 331—3 X |
| 2,995,711 | 8/1961 | Peter et al. | 331—94 X |

FOREIGN PATENTS 816,469  7/1959  Great Britain.

OTHER REFERENCES

Feher: Physical Review, vol. 114, No. 5, 1959, page 1224.

Wittke et al.: Physical Review, "Redetermination of the Hyperfine Splitting in the Ground State of Atomic Hydrogen," vol. 103, No. 3, August 1, 1956, pages 620–631 (page 625 relied on).

Kleppener et al.: Physical Review, "Theory of the Hydrogen Maser," vol. 126, No. 2, April 15, 1962, pages 603–615 (page 603 relied on).

Goldenberg et al.: Physical Review Letters, "Atomic Hydrogen Maser," vol. 5, No. 8, October 15, 1960, pages 361, 362.

Mark: RCA Technical Notes, "Ceramic Elements For Vacuum Tubes," RCA TN No. 144.

Estin: The Review of Scientific Instruments, March 1962, vol. 33, No. 3, pages 369–371.

NATHAN KAUFMAN, *Acting Primary Examiner.*

JOHN KOMINSKI, *Examiner.*

ROY LAKE, J. B. MULLINS, *Assistant Examiners.*